(12) United States Patent
Castinado et al.

(10) Patent No.: US 11,956,218 B2
(45) Date of Patent: Apr. 9, 2024

(54) SYSTEM FOR IMPLEMENTING DYNAMIC NETWORK CHANNEL SWITCHING FOR SECURE COMMUNICATION

(71) Applicant: BANK OF AMERICA CORPORATION, Charlotte, NC (US)

(72) Inventors: Joseph Benjamin Castinado, North Glenn, CO (US); Therese Humburg Willis, Apopka, FL (US); Christopher J. Smith, Johns Creek, GA (US); Kathleen Hanko Trombley, Oakboro, NC (US); Kevin Graham Robberts, Charlotte, NC (US); Lee Ann Proud, St. Augustine, FL (US); Adam Frederick Perrigo, Maiden, NC (US); Ann Ta, Scottsdale, AZ (US); Naoll Addisu Merdassa, Chakopee, MN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 295 days.

(21) Appl. No.: 17/553,946

(22) Filed: Dec. 17, 2021

(65) Prior Publication Data
US 2023/0198953 A1 Jun. 22, 2023

(51) Int. Cl.
*G06F 21/00* (2013.01)
*H04L 9/40* (2022.01)
(Continued)

(52) U.S. Cl.
CPC ............. *H04L 63/04* (2013.01); *H04W 12/03* (2021.01); *H04W 12/102* (2021.01);
(Continued)

(58) Field of Classification Search
CPC ........ H04L 63/04; H04L 63/18; H04W 12/03; H04W 12/102; H04W 12/63;
(Continued)

(56) References Cited

U.S. PATENT DOCUMENTS 7,840,178 B2 11/2010 Hellman
7,865,917 B2 1/2011 Hellman
(Continued)

*Primary Examiner* — Ghazal B Shehni
(74) *Attorney, Agent, or Firm* — Moore & Van Allen PLLC; Anup Shrinivasan Iyer

(57) ABSTRACT

Systems, computer program products, and methods are described herein for implementing dynamic network channel switching for secure communication. The present invention is configured to receive, from a first user input device, a resource transfer request via a first communication channel; determine, using a secure channel monitoring engine, that the first communication channel does not meet one or more preset channel requirements for secure communication; determine a second communication channel associated with a second user input device, wherein the second user input device is within a preset geographic radius of the first user input device, wherein the second user input device is associated with the resource distribution platform; trigger, via the second communication channel, the second user input device to establish a communication link with the first user input device to form an alternate communication channel; and execute, via the alternate communication channel, the resource transfer request.

18 Claims, 5 Drawing Sheets

(51) Int. Cl.
*H04W 12/03* (2021.01)
*H04W 12/102* (2021.01)
*H04W 12/63* (2021.01)
*H04W 72/51* (2023.01)
*H04W 76/14* (2018.01)
*H04W 76/23* (2018.01)
*G06Q 20/32* (2012.01)

(52) U.S. Cl.
CPC ........... *H04W 12/63* (2021.01); *H04W 72/51* (2023.01); *H04W 76/14* (2018.02); *H04W 76/23* (2018.02); *G06Q 20/322* (2013.01)

(58) Field of Classification Search
CPC ..... H04W 72/51; H04W 76/14; H04W 76/23; H04W 76/10; G06Q 20/322
See application file for complete search history.

(56) References Cited

U.S. PATENT DOCUMENTS

| | | | |
|---|---|---|---|
| 7,930,716 B2 | 4/2011 | Liga et al. | |
| 8,270,901 B2 | 9/2012 | Hellman | |
| 8,438,646 B2 | 5/2013 | Sidi | |
| 8,499,244 B2 | 7/2013 | Simon et al. | |
| 8,555,306 B2 | 10/2013 | Zmuda et al. | |
| 8,601,461 B2 | 12/2013 | Vrijsen | |
| 8,615,465 B2* | 12/2013 | Boutcher | G06Q 20/3224 705/39 |
| 8,627,354 B2 | 1/2014 | Hellman | |
| 8,732,764 B2 | 5/2014 | Kummer et al. | |
| 8,776,108 B2 | 7/2014 | Barsook et al. | |
| 9,191,450 B2 | 11/2015 | Sidi et al. | |
| 11,810,115 B2* | 11/2023 | Wagner | G06Q 20/3224 |
| 2006/0031892 A1 | 2/2006 | Cohen | |
| 2006/0222321 A1 | 10/2006 | Russ | |
| 2007/0107022 A1 | 5/2007 | Lawrence | |
| 2007/0248314 A1 | 10/2007 | Iggulden | |
| 2008/0040742 A1 | 2/2008 | Howcroft et al. | |
| 2008/0127247 A1 | 5/2008 | Allen et al. | |
| 2010/0094953 A1 | 4/2010 | Kwon et al. | |
| 2011/0082744 A1 | 4/2011 | Iida et al. | |
| 2017/0178135 A1* | 6/2017 | Bull | G06Q 20/40 |
| 2021/0006382 A1* | 1/2021 | Zhou | H04L 5/0094 |
| 2021/0352142 A1* | 11/2021 | Jayaram | G06Q 20/389 |

* cited by examiner

SYSTEM FOR IMPLEMENTING DYNAMIC NETWORK CHANNEL SWITCHING FOR SECURE COMMUNICATION

FIELD OF THE INVENTION

The present invention embraces a system for implementing dynamic network channel switching for secure communication.

BACKGROUND

In larger retail spaces, such as a shopping mall, flea market, food court, or the like, multiple users (merchants) often conduct business with customers within the same geographic vicinity. With constantly increasing online trade and e-commerce transactions, each user typically has a user input device (point-of-sale (POS) device) with a resource distribution platform installed therein that is configured to interact with a back-end server to execute resource transfers (transactions) via a secure communication channel. However, due to the sprawling nature of some of these retail spaces, this secure communication is often wireless, and wireless technologies may be affected by packet loss due to many factors such as network congestion, hardware issues, software bugs, physical obstacles, and/or the like. This may result in some user input devices within the retail space to have better connectivity than some other user input devices within the same retail space.

Therefore, there is a need for a system to implement dynamic channel switching for secure communication.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing dynamic network channel switching for secure communication is presented. The system comprising: at least one non-transitory storage device; and at least one processing device coupled to the at least one non-transitory storage device, wherein the at least one processing device is configured to: receive, from a first user input device, a resource transfer request via a first communication channel, wherein the first user input device is associated with a resource distribution platform; determine, using a secure channel monitoring engine, that the first communication channel does not meet one or more preset channel requirements for secure communication; determine a second communication channel associated with a second user input device, wherein the second user input device is within a preset geographic radius of the first user input device, wherein the second user input device is associated with the resource distribution platform; trigger, via the second communication channel, the second user input device to establish a communication link with the first user input device, wherein the second communication channel and the communication link form an alternate communication channel with the first user input device; execute, via the alternate communication channel, the resource transfer request; and sever the alternate communication channel with the first user input device in response to executing the resource transfer request.

In some embodiments, the second communication channel meets the one or more preset channel requirements for secure communication.

In some embodiments, the at least one processing device is further configured to: receive, via the second communication channel, an indication from the second user input device that the communication link has been established with the first user input device; and transfer bi-directional communications associated with the resource transfer request with the first user device from the first communication channel to the alternate communication channel in response to receiving the indication.

In some embodiments, transferring further comprises temporarily severing the first communication channel with the first user device.

In some embodiments, the at least one processing device is further configured to: initiate, using the secure channel monitoring engine, an assessment of the first communication channel; retrieve one or more channel configurations associated with the first communication channel; and determine that the one or more channel configurations does not meet the one or more preset channel requirements for secure communication.

In some embodiments, the at least one processing device is further configured to: continuously monitor the one or more communication channels associated with the one or more user input devices, wherein continuously monitoring further comprises continuously determining whether the one or more communication channels meets the one or more preset channel requirements; determine, based on at least continuously monitoring the one or more communication channels, one or more user input devices whose communication channels does not meet the one or more preset channel requirements; and dynamically determine one or more alternate communication channels for the one or more user input devices whose communication channels does not meet the one or more preset channel requirements using one or more user input devices whose communication channels meets the one or more preset channel requirements.

In some embodiments, the at least one processing device is further configured to: receive, from the first user input device, one or more user input devices that are within the preset geographic radius of the first user input device, wherein the one or more user input devices are associated with one or more communication channels, wherein the one or more user input devices are associated with the resource distribution platform; determine, using the secure channel monitoring engine, at least one of the one or more communication channels meets the one or more preset channel requirements for secure communication; and trigger, via at least one of the one or more communication channels, a corresponding user input device to establish the communication link with the first user input device, wherein the at least one of the one or more communication channel and the communication link form the alternate communication channel with the first user input device.

In some embodiments, the at least one processing device is further configured to: initiate, using the secure channel monitoring engine, an assessment of the one or more communication channels; retrieve one or more channel configurations associated with the one or more communication channels; and determine that the one or more channel configurations associated with a subset of the one or more communication channels meets the one or more preset channel requirements for secure communication.

In some embodiments, the at least one processing device is further configured to: determine a quantitative measure associated with the one or more channel configurations associated with the subset of the one or more communication channels meeting the one or more preset channel requirements for secure communication; and determine the at least one of the one or more communication channels based on at least the quantitative measure.

In another aspect, a computer program product for implementing dynamic network channel switching for secure communication is presented. The computer program product comprising a non-transitory computer-readable medium comprising code causing a first apparatus to: receive, from a first user input device, a resource transfer request via a first communication channel, wherein the first user input device is associated with a resource distribution platform; determine, using a secure channel monitoring engine, that the first communication channel does not meet one or more preset channel requirements for secure communication; determine a second communication channel associated with a second user input device, wherein the second user input device is within a preset geographic radius of the first user input device, wherein the second user input device is associated with the resource distribution platform; trigger, via the second communication channel, the second user input device to establish a communication link with the first user input device, wherein the second communication channel and the communication link form an alternate communication channel with the first user input device; execute, via the alternate communication channel, the resource transfer request; and sever the alternate communication channel with the first user input device in response to executing the resource transfer request.

In yet another aspect, a method for implementing dynamic network channel switching for secure communication is presented. The method comprising: receiving, from a first user input device, a resource transfer request via a first communication channel, wherein the first user input device is associated with a resource distribution platform; determining, using a secure channel monitoring engine, that the first communication channel does not meet one or more preset channel requirements for secure communication; determining a second communication channel associated with a second user input device, wherein the second user input device is within a preset geographic radius of the first user input device, wherein the second user input device is associated with the resource distribution platform; triggering, via the second communication channel, the second user input device to establish a communication link with the first user input device, wherein the second communication channel and the communication link form an alternate communication channel with the first user input device; executing, via the alternate communication channel, the resource transfer request; and severing the alternate communication channel with the first user input device in response to executing the resource transfer request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
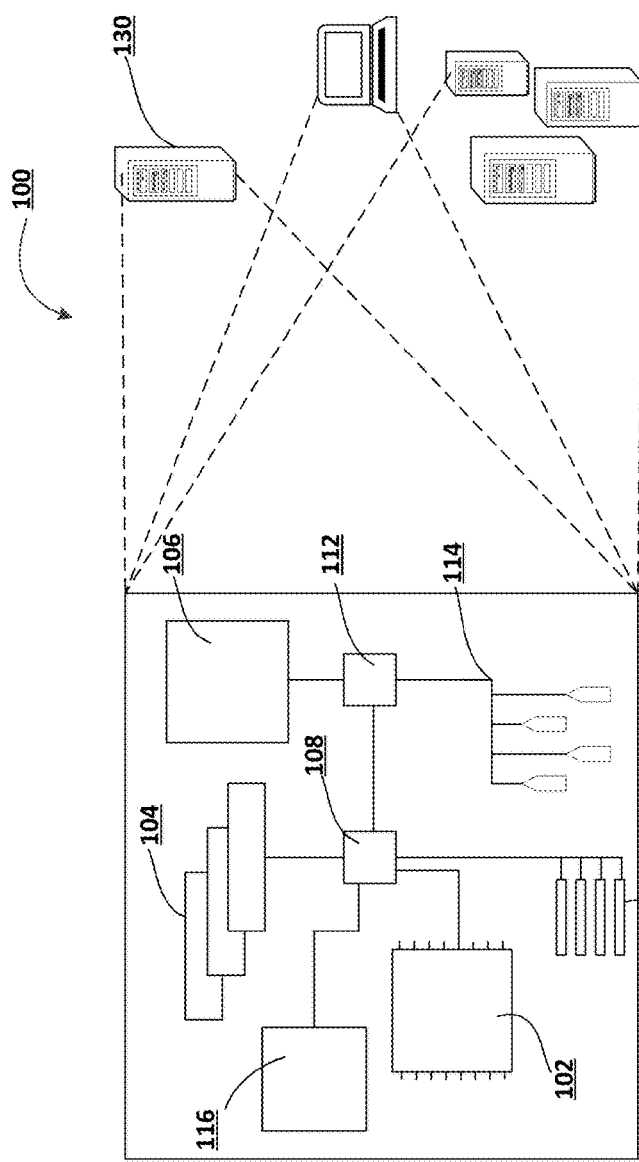
Figure 1:
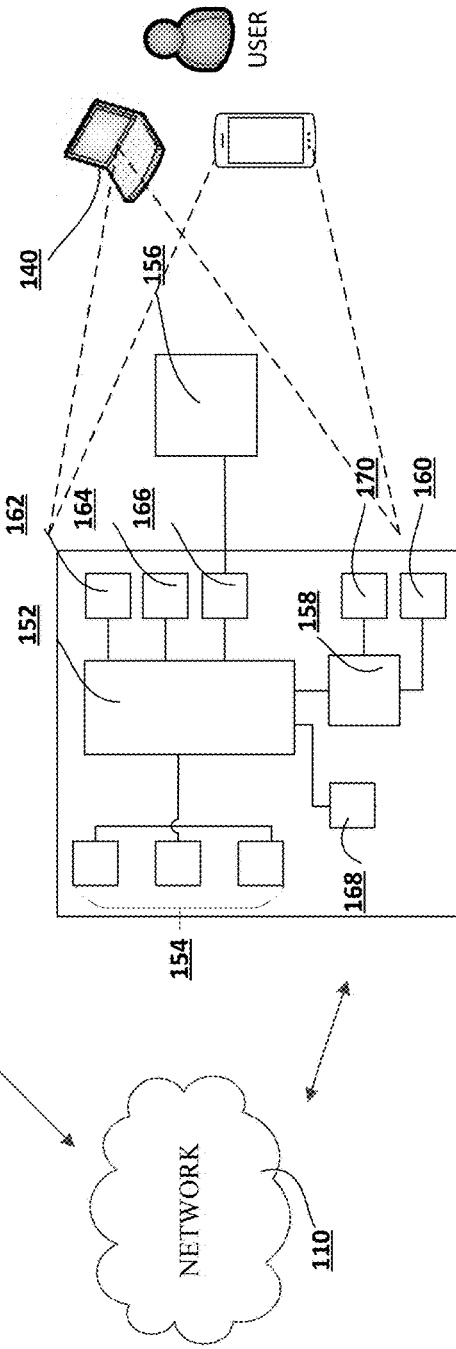
Figure 2:
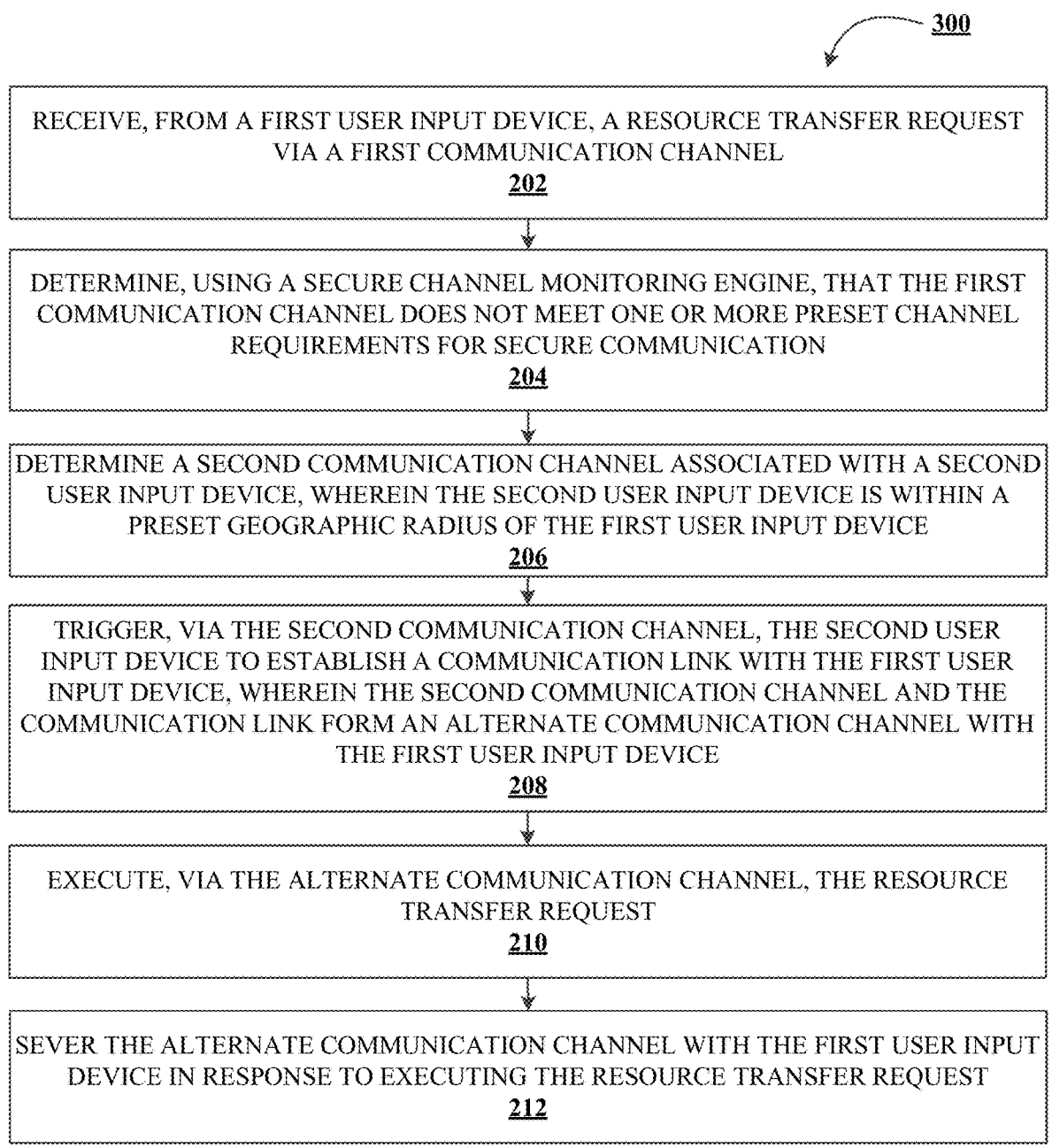
Figure 3:
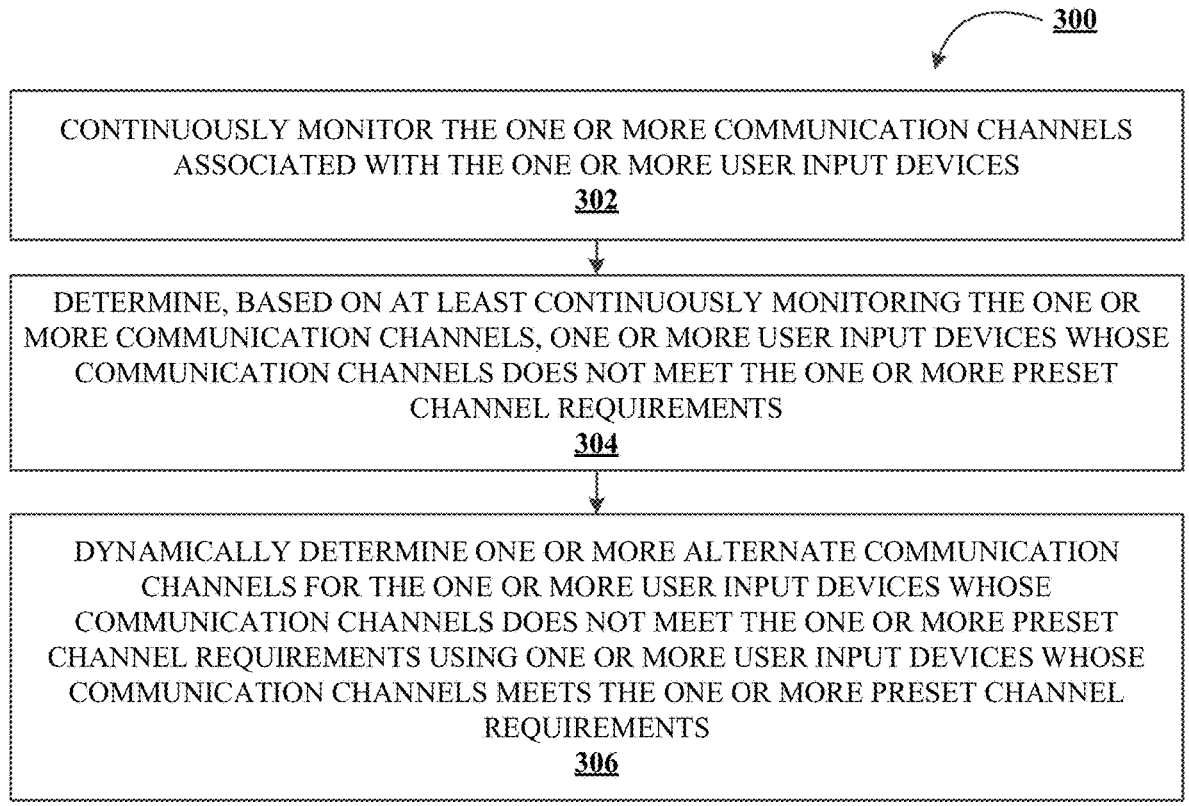
Figure 4:
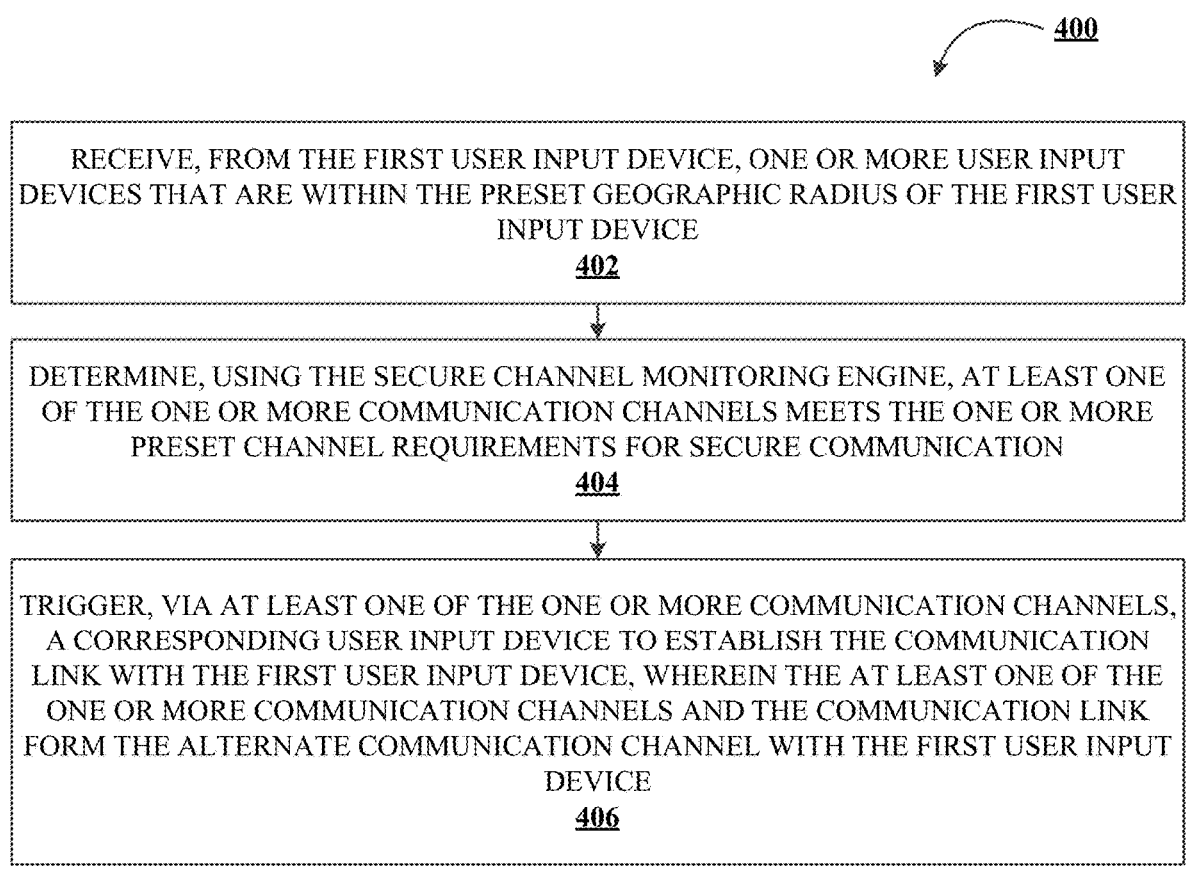
Figure 5:
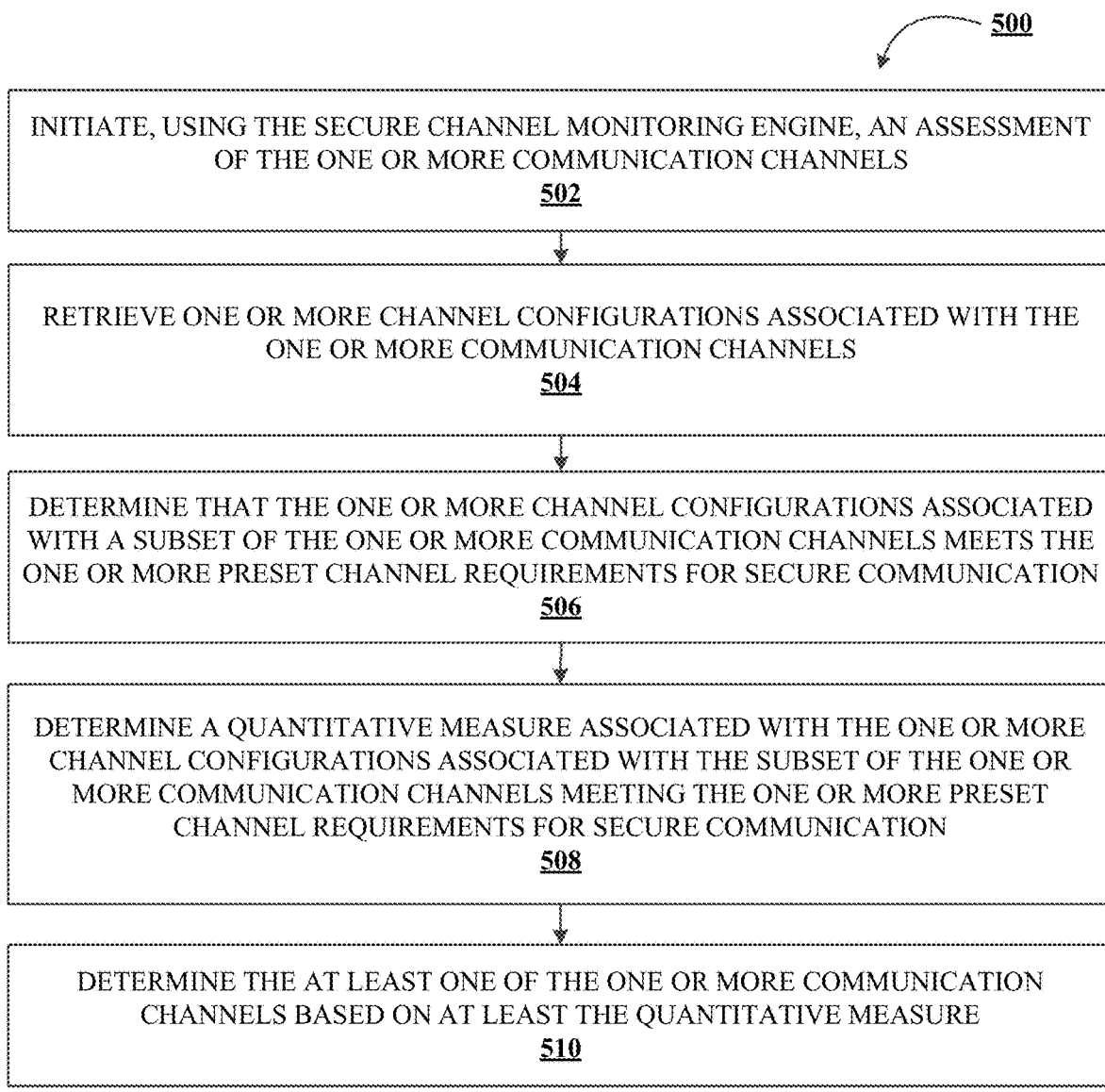

Having thus described embodiments of the invention in general terms, reference will now be made the accompanying drawings, wherein:

FIG. 1 illustrates technical components of a system for implementing dynamic network channel switching for secure communication, in accordance with an embodiment of the invention;

FIG. 2 illustrates a process flow for implementing dynamic network channel switching for secure communication, in accordance with an embodiment of the invention;

FIG. 3 illustrates a process flow for dynamically determining an alternate communication channel for secure communication, in accordance with an embodiment of the invention;

FIG. 4 illustrates a process flow for dynamic network channel switching with user input devices within a preset geographic radius, in accordance with an embodiment of the invention;

FIG. 5 illustrates a process flow for dynamic network channel switching based on a quantitative measure, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be a merchant who uses a resource distribution platform maintained and managed by the entity. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "communication channel" may refer to either to a physical transmission medium such as a wire, or to a logical connection over a multiplexed medium such as a radio channel in telecommunications and computer networking. A communication channel may be used to facilitate data transfer in one direction only, or it may be used to facilitate data transfer in in both directions between two (or several) devices in the form of an information signal, for example a digital bit stream. At any given instant, the devices using the communication channel may be sending, receiving, or both.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

In larger retail spaces, such as a shopping mall, flea market, food court, or the like, multiple users (merchants) often conduct business with customers within the same geographic vicinity. With constantly increasing online trade and e-commerce transactions, each user typically has a user input device (point-of-sale (POS) device) with a resource distribution platform installed therein that is configured to interact with a back-end server to execute resource transfers (transactions) via a secure communication channel. However, due to the sprawling nature of some of these retail spaces, this secure communication is often wireless, and wireless communication channels may be affected due to many factors such as network congestion, hardware issues, software bugs, physical obstacles, and/or the like. This may result in some user input devices within the retail space to have better connectivity than some other user input devices within the same retail space. Therefore, there is a need for a system to implement dynamic channel switching for secure communication.

The present invention provides the functional benefit of continuously monitoring each communication channel that is used by a user input device to execute a resource transfer to determine whether that communication channel meets the preset secure channel requirements to facilitate secure communication. In cases where the communication channel does not meet the preset secure channel requirements, the present invention identifies an alternate communication channel to the user input device and dynamically switches to the alternate communication channel to continue (or begin) execution of the resource transfer. To this end, the present invention uses other user input devices with communication channels that meet the preset secure channel requirements in the same geographic vicinity of the particular user input device to establish alternate communication channels to the user device. In some embodiments, the dynamic switching is done in real-time or near real-time in such a way that when the initial communication channel fails to meet the preset secure channel requirements during the execution of the resource transfer, the switch to the alternate communication channel is seamless and does not affect the execution of the resource transfer.

FIG. 1 illustrates technical components of a system for implementing dynamic network channel switching for secure communication 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, blade servers, mainframes, or any combination of the aforementioned. In accordance with embodiments of the invention, the user input device 140 is intended to represent various forms of mobile devices, such as personal digital assistants, cellular telephones, smartphones, point-of-sale (POS) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (e.g., other similar user input devices) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for implementing dynamic network channel switching for secure communication 200, in accordance with an embodiment of the invention. As shown in block 202, the process flow includes receiving, from a first user input device, a resource transfer request via a first communication channel. In some embodiments, the user device (e.g., first user input device) may be a POS device that is configured to capture information associated with payment instruments from customers and transmit this information to the back-end system (e.g., system) associated with the entity for authorization and finally, to transfer resources to the user. As part of the resource transfer request, the system may be configured to receive secure information associated with the resource transfer, such as, customer payment instrument information, an amount of funds, a date of transfer request, a timeline for transfer, and/or the like.

Next, as shown in block 204, the process flow includes determining, using a secure channel monitoring engine, that the first communication channel does not meet one or more preset channel requirements for secure communication. To prevent unauthorized access, the communication channel, in addition to the user input device must meet certain security requirements at all times. The security requirements may be represented in the form of preset secure channel requirements that need to be met by a communication channel to be deemed secure. In some embodiments, the preset secure channel requirements for a communication channel may vary depending on the type of resource transfer requested. Resource transfers may be characterized into various types based on the sensitive nature of the data being transmitted through the communication channel. In one example, communication channels used to transmit information associated with resource transfers that do not include any sensitive data may have no preset secure channel requirements. Such a communication channel may neither guarantee authenticity nor confidentiality. In another example, communication channels used to transmit information associated with resource transfers that include sensitive data may include certain preset secure channel requirements that when met, may guarantee authenticity and/or confidentiality of transmitted information.

In some embodiments, the preset secure channel requirements may be predetermined thresholds associated with channel configurations. This threshold may be configured by the user and/or the entity during initial set up of the user input device and may be modifiable by users with adequate permissions. In one aspect, the channel configurations may include channel noise, channel bandwidth, channel capacity, transmission time, propagation time, channel strength, and/or the like. In some embodiments, the system may be configured to assess each communication channel individually and independently, using the secure channel monitoring engine, to determine whether the communication channel meets the preset secure channel requirements. As part of the assessment, the system may be configured to measure the channel configurations associated with the communication channel against the preset channel requirements to determine whether a communication channel is suitable for secure communication. In this regard, each preset secure channel requirement may be associated with a priority. Determining whether a communication channel is suitable for secure communication may depend on the priority of specific secure channel requirements that are being met by the channel configurations. For example, if the preset secure channel requirement with the highest priority is met by the channel configurations, while the preset secure channel requirement with the lowest priority is not met, the communication channel may still be determined to be suitable for secure communication. Here, the channel configurations associated with the first communication channel do not meet the preset channel requirements and is thus determined to be not suitable for secure communication.

Next, as shown in block 206, the process flow includes determining a second communication channel associated with a second user input device, wherein the second user input device is within a preset geographic radius of the first user input device. As described herein, in larger retail spaces where users often conduct business with customers in a geographic vicinity defined by the preset geographic radius, a second user input device that is associated with the same resource distribution platform as the first user input device may be used to establish an alternate communication link with the first user input instead of the first communication channel. Unlike the first communication channel, the second communication channel meets the one or more preset channel requirements for secure communication is thus determined to be suitable for secure communication.

Next, as shown in block 208, the process flow includes triggering, via the second communication channel, the second user input device to establish a communication link with the first user input device, wherein the second communication channel and the communication link form an alternate communication channel with the first user input device. As described herein, the first user input device and the second user input device may be associated with a common resource distribution platform (managed by the entity) that allows them to communicably link with each other to facilitate the establishing of the alternate communication channel. The first user input device and the second user input device may pre-register with the resource distribution platform that allows them to be detected and recognized as being within the geographic vicinity (defined by the preset geographic radius), while also opting-in to be available as an intermediary unit to establish alternate communication channels with other user input devices in the vicinity.

In some embodiments, the system may be configured to receive, via the second communication channel, an indication from the second user input device that the communication link has been established with the first user input device. In one aspect, the link between the second user input device and the first user input device may be established due to the nature of the two user input devices being associated with the same resource distribution platform. In response, the system may be configured to transfer bi-directional communications associated with the resource transfer request with the first user device from the first communication channel to the alternate communication channel. In some embodiments, this may involve temporarily severing the first communication channel with the first user device.

Next, as shown in block 210, the process flow includes executing, via the alternate communication channel, the resource transfer request. Next, as shown in block 212, the process flow includes severing the alternate communication channel with the first user input device in response to executing the resource transfer request. In some embodiments, severing the alternate communication channel with the first user input device may include re-establishing the first communication channel with the first user input device.

FIG. 3 illustrates a process flow for dynamically determining an alternate communication channel for secure communication 300, in accordance with an embodiment of the invention. As shown in block 302, the process flow includes continuously monitoring the one or more communication channels associated with the one or more user input devices. In some embodiments, the channel configuration values of a communication channel may vary in real-time depending on various factors such as distance and direction of the nearest network device, transmission power, network congestion, environmental factors, obstructions, and/or the like. By continuously monitoring the one or more communication channels, the system may be configured to continuously analyze whether the one or more communication channels meets the one or more preset channel requirements.

Next, as shown in block 304, the process flow includes determining, based on at least continuously monitoring the one or more communication channels, one or more user input devices whose communication channels does not meet the one or more preset channel requirements.

Next, as shown in block 306, the process flow includes dynamically determining one or more alternate communication channels for the one or more user input devices whose communication channels does not meet the one or more preset channel requirements using one or more user input devices whose communication channels meets the one or more preset channel requirements. In this way, the system may be configured to determine a number of different possible alternate communication channels to execute the resource transfer request and may choose any one of the applicable alternate communication channels for the purpose.

FIG. 4 illustrates a process flow for dynamic network channel switching with user input devices within a preset geographic radius 400, in accordance with an embodiment of the invention. As shown in block 402, the process flow includes receiving, from the first user input device, one or more user input devices that are within the preset geographic radius of the first user input device. Instead of having to continuously monitor the communication channels for all the user input device in the geographic vicinity of the first user input device, the system may be configured to limit the monitoring to the communication channels associated with one or more user input devices that are within the preset geographic radius of the first user input device. In cases where the channel issues depend on the specific location of the first user input device, the system may be configured to determine one or more user input devices that are outside the preset geographic radius as the user input devices that are closer in proximity to the first user input device may suffer from the same issues as the first user input device.

Next, as shown in block 404, the process flow includes determining, using the secure channel monitoring engine, at least one of the one or more communication channels meets the one or more preset channel requirements for secure communication. Next, as shown in block 406, the process flow includes triggering, via at least one of the one or more communication channels, a corresponding user input device to establish the communication link with the first user input device, wherein the at least one of the one or more communication channel and the communication link form the alternate communication channel with the first user input device.

FIG. 5 illustrates a process flow for dynamic network channel switching based on a quantitative measure 500, in accordance with an embodiment of the invention. As shown in block 502, the process flow includes initiating, using the secure channel monitoring engine, an assessment of the one or more communication channels. Next, as shown in block 504, the process flow includes retrieving one or more channel configurations associated with the one or more communication channels. Next, as shown in block 506, the process flow includes determining that the one or more channel configurations associated with a subset of the one or more communication channels meets the one or more preset channel requirements for secure communication.

Next, as shown in block 508, the process flow includes determining a quantitative measure associated with the one or more channel configurations associated with the subset of the one or more communication channels meeting the one or more preset channel requirements for secure communication. In some embodiments, the system may be configured to use machine learning techniques to classify a communication channel as secure or otherwise based on the extent to which the channel configurations meet the preset channel requirements. Accordingly, the system may be configured to initiate a machine learning model on the one or more channel configurations of the one or more communication channels. As described herein, the machine learning model may refer to a mathematical model generated by machine learning algorithms based on training data, to make predictions or decisions without being explicitly programmed to do so. In some embodiments, the system may be configured to generate the machine learning model by implementing one or more machine learning algorithms capable of receiving an analyzing input data to predict output values within an acceptable range.

Accordingly, to generate the machine learning model capable of determining whether a communication channel is capable of facilitating secure communication, the system may be configured to determine channel configuration values for communication channels that have been known to facilitate secure communications in the past, i.e., their channel configurations meet the preset secure channel requirements. This information is used as training dataset to train the machine learning model. Once trained, the system may be configured to determine classification parameters for the machine learning model that are then used to classify unseen communication channels. In addition to classifying the unseen communication channels as being capable of facilitating secure communications or not, the system may be configured to determine a likelihood associated with the classification, that forms the basis of the quantitative measure.

Next, as shown in block 510, the process flow includes determining the at least one of the one or more communication channels based on at least the quantitative measure. For example, the communication channel with the highest likelihood of facilitating secure communication may be chosen over the others.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing dynamic network channel switching for secure communication, the system comprising:
   at least one processing device; and
   at least one non-transitory storage device containing instructions that, when executed by the at least one processing device, cause the at least one processing device to:
   receive, from a first user input device, a resource transfer request via a first communication channel, wherein the first user input device is associated with a resource distribution platform;
   determine, using a secure channel monitoring engine, that the first communication channel does not meet one or more preset channel requirements for secure communication;
   determine a second communication channel associated with a second user input device, wherein the second user input device is within a preset geographic radius of the first user input device, wherein the second user input device is associated with the resource distribution platform;
   trigger, via the second communication channel, the second user input device to establish a communication link with the first user input device, wherein the second communication channel and the communication link form an alternate communication channel with the first user input device;
   receive, via the second communication channel, an indication from the second user input device that the communication link has been established with the first user input device;
   transfer bi-directional communications associated with the resource transfer request with the first user device from the first communication channel to the alternate communication channel in response to receiving the indication;
   execute, via the alternate communication channel, the resource transfer request; and
   sever the alternate communication channel with the first user input device in response to executing the resource transfer request.

2. The system of claim 1, wherein the second communication channel meets the one or more preset channel requirements for secure communication.

3. The system of claim 1, wherein transferring further comprises temporarily severing the first communication channel with the first user device.

4. The system of claim 1, wherein the instructions, when executed, further cause the at least one processing device to:
   initiate, using the secure channel monitoring engine, an assessment of the first communication channel;
   retrieve one or more channel configurations associated with the first communication channel; and
   determine that the one or more channel configurations does not meet the one or more preset channel requirements for secure communication.

5. The system of claim 1, wherein the instructions, when executed, further cause the at least one processing device to:
   continuously monitor one or more communication channels associated with one or more user input devices, wherein continuously monitoring further comprises continuously determining whether the one or more communication channels meets the one or more preset channel requirements;
   determine, based on at least continuously monitoring the one or more communication channels, one or more user input devices whose communication channels does not meet the one or more preset channel requirements; and
   dynamically determine one or more alternate communication channels for the one or more user input devices whose communication channels does not meet the one or more preset channel requirements using one or more user input devices whose communication channels meets the one or more preset channel requirements.

6. The system of claim 5, wherein the instructions, when executed, further cause the at least one processing device to:
   receive, from the first user input device, one or more user input devices that are within the preset geographic radius of the first user input device, wherein the one or more user input devices that are within the preset geographic radius of the first user input device are associated with the one or more communication channels, wherein the one or more user input devices that are within the preset geographic radius of the first user input device are associated with the resource distribution platform;

determine, using the secure channel monitoring engine, at least one of the one or more communication channels meets the one or more preset channel requirements for secure communication; and trigger, via at least one of the one or more communication channels, a corresponding user input device to establish the communication link with the first user input device, wherein the at least one of the one or more communication channel and the communication link form the alternate communication channel with the first user input device.

7. The system of claim 6, wherein the instructions, when executed, further cause the at least one processing device to:

initiate, using the secure channel monitoring engine, an assessment of the one or more communication channels;

retrieve one or more channel configurations associated with the one or more communication channels; and determine that the one or more channel configurations associated with a subset of the one or more communication channels meets the one or more preset channel requirements for secure communication.

8. The system of claim 7, wherein the instructions, when executed, further cause the at least one processing device to:

determine a quantitative measure associated with the one or more channel configurations associated with the subset of the one or more communication channels meeting the one or more preset channel requirements for secure communication; and determine the at least one of the one or more communication channels based on at least the quantitative measure.

9. A computer program product for implementing dynamic network channel switching for secure communication, the computer program product comprising a non-transitory computer-readable medium comprising code causing a first apparatus to:

receive, from a first user input device, a resource transfer request via a first communication channel, wherein the first user input device is associated with a resource distribution platform;

determine, using a secure channel monitoring engine, that the first communication channel does not meet one or more preset channel requirements for secure communication;

determine a second communication channel associated with a second user input device, wherein the second user input device is within a preset geographic radius of the first user input device, wherein the second user input device is associated with the resource distribution platform;

trigger, via the second communication channel, the second user input device to establish a communication link with the first user input device, wherein the second communication channel and the communication link form an alternate communication channel with the first user input device;

receive, via the second communication channel, an indication from the second user input device that the communication link has been established with the first user input device;

transfer bi-directional communications associated with the resource transfer request with the first user device from the first communication channel to the alternate communication channel in response to receiving the indication;

execute, via the alternate communication channel, the resource transfer request; and sever the alternate communication channel with the first user input device in response to executing the resource transfer request.

10. The computer program product of claim 9, wherein the second communication channel meets the one or more preset channel requirements for secure communication.

11. The computer program product of claim 9, wherein transferring further comprises temporarily severing the first communication channel with the first user device.

12. The computer program product of claim 9, wherein the code further causes the first apparatus to:

initiate, using the secure channel monitoring engine, an assessment of the first communication channel;

retrieve one or more channel configurations associated with the first communication channel; and determine that the one or more channel configurations does not meet the one or more preset channel requirements for secure communication.

13. The computer program product of claim 9, wherein the code further causes the first apparatus is further configured to:

continuously monitor one or more communication channels associated with one or more user input devices, wherein continuously monitoring further comprises continuously determining whether the one or more communication channels meets the one or more preset channel requirements;

determine, based on at least continuously monitoring the one or more communication channels, one or more user input devices whose communication channels does not meet the one or more preset channel requirements; and dynamically determine one or more alternate communication channels for the one or more user input devices whose communication channels does not meet the one or more preset channel requirements using one or more user input devices whose communication channels meets the one or more preset channel requirements.

14. The computer program product of claim 13, wherein the code further causes the first apparatus is further configured to:

receive, from the first user input device, one or more user input devices that are within the preset geographic radius of the first user input device, wherein the one or more user input devices that are within the preset geographic radius of the first user input device are associated with the one or more communication channels, wherein the one or more user input devices that are within the preset geographic radius of the first user input device are associated with the resource distribution platform;

determine, using the secure channel monitoring engine, at least one of the one or more communication channels meets the one or more preset channel requirements for secure communication; and trigger, via at least one of the one or more communication channels, a corresponding user input device to establish the communication link with the first user input device, wherein the at least one of the one or more communication channel and the communication link form the alternate communication channel with the first user input device.

15. The computer program product of claim 14, wherein the code further causes the first apparatus to:
- initiate, using the secure channel monitoring engine, an assessment of the one or more communication channels;
- retrieve one or more channel configurations associated with the one or more communication channels; and
- determine that the one or more channel configurations associated with a subset of the one or more communication channels meets the one or more preset channel requirements for secure communication.

16. The computer program product of claim 15, wherein the code further causes the first apparatus to:
- determine a quantitative measure associated with the one or more channel configurations associated with the subset of the one or more communication channels meeting the one or more preset channel requirements for secure communication; and
- determine the at least one of the one or more communication channels based on at least the quantitative measure.

17. A method for implementing dynamic network channel switching for secure communication, the method comprising:
- receiving, from a first user input device, a resource transfer request via a first communication channel, wherein the first user input device is associated with a resource distribution platform;
- determining, using a secure channel monitoring engine, that the first communication channel does not meet one or more preset channel requirements for secure communication;
- determining a second communication channel associated with a second user input device, wherein the second user input device is within a preset geographic radius of the first user input device, wherein the second user input device is associated with the resource distribution platform;
- triggering, via the second communication channel, the second user input device to establish a communication link with the first user input device, wherein the second communication channel and the communication link form an alternate communication channel with the first user input device;
- receiving, via the second communication channel, an indication from the second user input device that the communication link has been established with the first user input device;
- transferring bi-directional communications associated with the resource transfer request with the first user device from the first communication channel to the alternate communication channel in response to receiving the indication;
- executing, via the alternate communication channel, the resource transfer request; and
- severing the alternate communication channel with the first user input device in response to executing the resource transfer request.

18. The method of claim 17, wherein the second communication channel meets the one or more preset channel requirements for secure communication.

\* \* \* \* \*